United States Patent [19]

Ritter

[11] 3,687,218
[45] Sept. 29, 1972

[54] APPARATUS FOR AND METHOD OF CONTROLLING THE FIRING OF SEISMIC SOUND SOURCES

[72] Inventor: Sammie F. Ritter, Dallas, Tex.
[73] Assignee: Mobil Oil Corporation
[22] Filed: Sept. 28, 1970
[21] Appl. No.: 76,126

[52] U.S. Cl..........181/0.5 FS, 181/0.5 H, 181/0.5 R, 324/188, 340/7 R
[51] Int. Cl. ............................................... G01v 1/08
[58] Field of Search ..........324/188; 181/0.5 F, 0.5 S, 181/0.5 H; 340/7 R; 317/80

[56] References Cited

UNITED STATES PATENTS

| 3,304,533 | 2/1967 | Huckabay et al. | 340/17 |
| 3,602,878 | 8/1971 | Sullivan | 340/7 R |
| 3,079,601 | 2/1963 | Carter et al. | 324/188 |
| 3,133,231 | 5/1964 | Fail et al. | 102/70.2 |

Primary Examiner—Benjamin A. Borchelt
Assistant Examiner—H. A. Birmiel
Attorney—William J. Scherback, Frederick E. Dumoulin, Arthur F. Zobal, Andrew L. Gaboriault and Sidney A. Johnson

[57] ABSTRACT

A digital control system for establishing preset delays in firing a plurality of pneumatic sound sources. Predetermined firing command delays between system triggering and source triggering are set by appropriately setting each of a plurality of digital switches associated with the sources. As the elapsed time represented by a count in a command delay register and each of the predetermined delay times set by the switches becomes equal as determined by a coincidence detector, fire commands are generated for each of the sources. After the sources are fired, counts accumulated in firing delay registers associated with the sources are terminated and the counts, which correspond to the delays between triggering and actual firing of the sources, are displayed.

6 Claims, 6 Drawing Figures 3,687,218

APPARATUS FOR AND METHOD OF CONTROLLING THE FIRING OF SEISMIC SOUND SOURCES

FIELD OF THE INVENTION

This invention relates to systems for controlling the firing of a plurality of seismic sound sources.

In marine seismic exploration, a plurality of seismic sound sources are often utilized in order to shape a seismic energy wave front. In some instances, the seismic sound sources or guns are positioned at different depths and the guns are fired at different times to achieve reinforcement of the primary pulse and cancellation of the bubble pulse. In other instances, the guns are positioned at the same depth and fired simultaneously.

It is of course desirable to precisely control the firing times of the seismic sound sources in order to appropriately shape the seismic wavefront. Considerable difficulties arise in achieving this precise control without sacrificing the flexibility of the system; i.e., the ability to set different firing times for different circumstances. Additional difficulties arise when pneumatic sound sources are utilized which have characteristic firing delays defined as the time lapse between source firing command and source firing. The characteristic firing delay of any given pneumatic sound source can change after continued use thereby increasing the difficulties in achieving precise control.

DESCRIPTION OF THE PRIOR ART

The prior art control systems for firing a plurality of seismic sound sources have not provided sufficiently flexible nor precise control of the sound source firing times. For example, U.S. Pat. No. 3,304,533 — Huckabay discloses a control system comprising a decade counter tube which establishes a fixed firing sequence for a plurality of sound sources in response to pulses generated by an oscillator. As a result, it is not possible to independently vary the firing times of the sound sources nor is it possible to fire the sound sources simultaneously. Of course, it is not possible to compensate for changes in the characteristic firing delays of the sound sources. Such changes are a particular problem with pneumatic sound sources.

Furthermore, the prior art control systems for firing a plurality of sound sources do not indicate the delay between triggering the control system and actual firing of the sound sources. As a consequence, there is no indication as to when the control system fired the sound sources nor is there any indication of the characteristic firing delays of the sound sources or changes in the characteristic firing delays.

SUMMARY OF THE INVENTION

In accordance with one aspect of the invention, the firing times for a plurality of seismic sound sources are variably preset. This aspect of the invention may be provided by a digital control system comprising means for triggering the system and means for variably presetting a predetermined firing command delay time with respect to system triggering for each of the sound sources. The system further comprises means for determining the elapsed time after system triggering and means for detecting coincidences between the elapsed time and the predetermined firing command delay times of the respective sound sources. As coincidences between the elapsed time and the predetermined firing command delays are detected, firing commands are given to the respective sound sources.

In accordance with another aspect of this invention, the delays between system triggering and actual firings of the sound sources are displayed thereby indicating any necessary adjustment in the setting of the variable firing command delay times in order to compensate for unknown or varying characteristic delay times of the sound sources.

This aspect of the invention may be provided by a digital control system comprising means for determining the elapsed time between system triggering and firing of each sound source and further comprising means for displaying this elapsed time for each source.

DESCRIPTION OF THE PREFERRED EMBODIMENT

Figure 1:
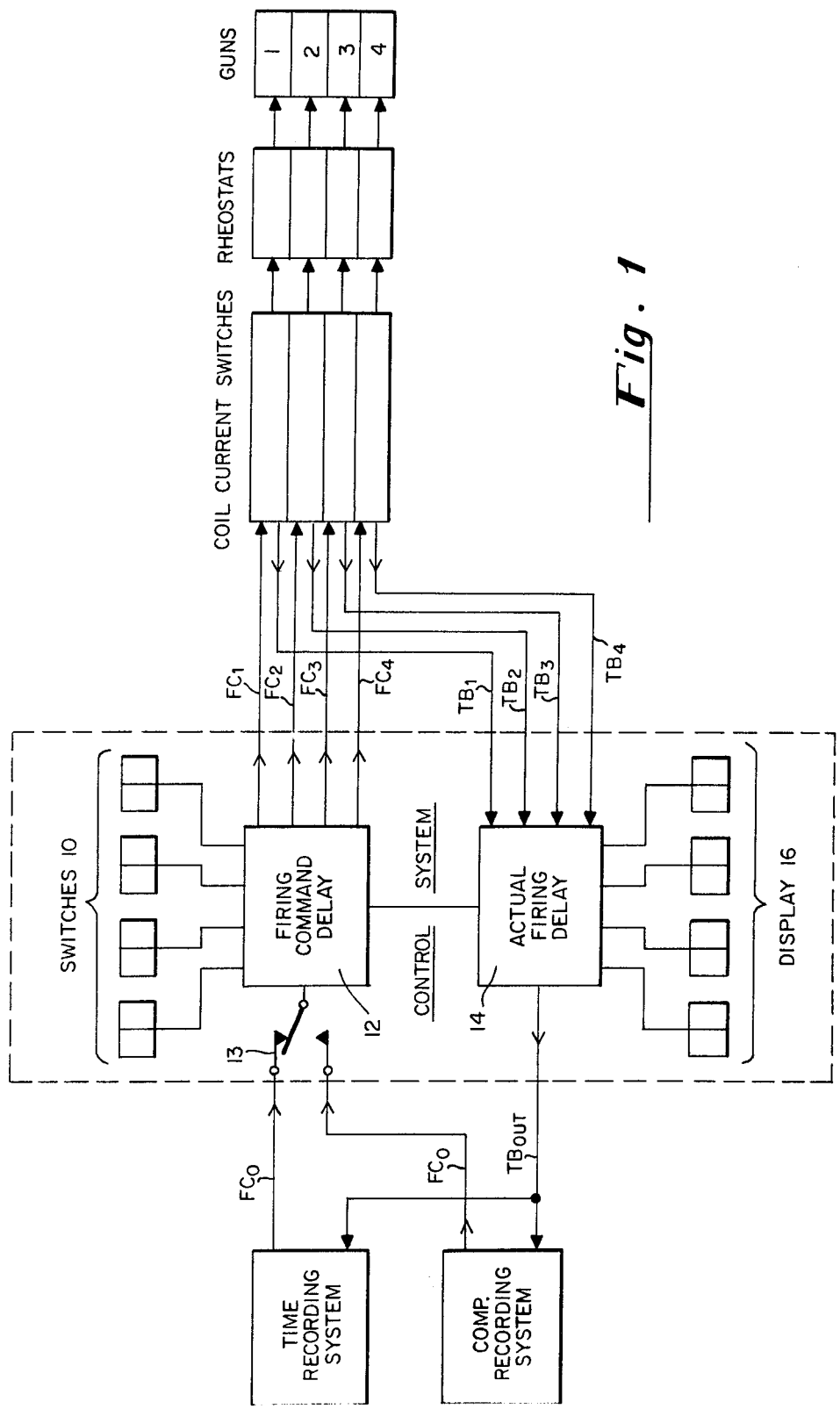
FIG. 1 is a block diagram of a seismic exploration system utilizing a control system embodying the invention.

FIG. 1 discloses a seismic exploration system utilizing a control system for firing or triggering pneumatic sound sources or guns 1, 2, 3, and 4. The control system may be programmed by switch means 10 including four switches corresponding to guns 1, 2, 3, and 4 so as to fire the guns simultaneously or in any staggered relationship thus developing a directivity in the resulting seismic energy wavefront. A firing command $FC_0$ or trigger signal which is generated by a recording system operating in a timed mode or a recording system operating in a composite mode is then applied to a firing command delay means 12 through a switch 13 to initiate the firing cycle. When the time elapsed after the system firing command $FC_0$ equals the programmed firing command delays set with switches 10, firing commands $FC_1$, $FC_2$, $FC_3$ and $FC_4$ are generated and applied to four coil current switches and coil current controlling rheostats associated with guns 1, 2, 3, and 4.

The guns 1, 2, 3, and 4 do not fire immediately upon receiving the firing commands $FC_1$, $FC_2$, $FC_3$, and $FC_4$ since each gun has a characteristic firing delay before the lid moves and exhausts the compressed air. When each lid does move corresponding to actual firing, a time break TB is generated for each gun. The time breaks $TB_1$, $TB_2$, $TB_3$, and $TB_4$ for the guns 1, 2, 3, and 4 are then applied to a means 14 for determining the actual firing delays which are then indicated at a display means 16 including four indicators. The earliest of the time breaks $TB_1$, $TB_2$, $TB_3$ and $TB_4$ is applied to the recording systems.

Figure 2:
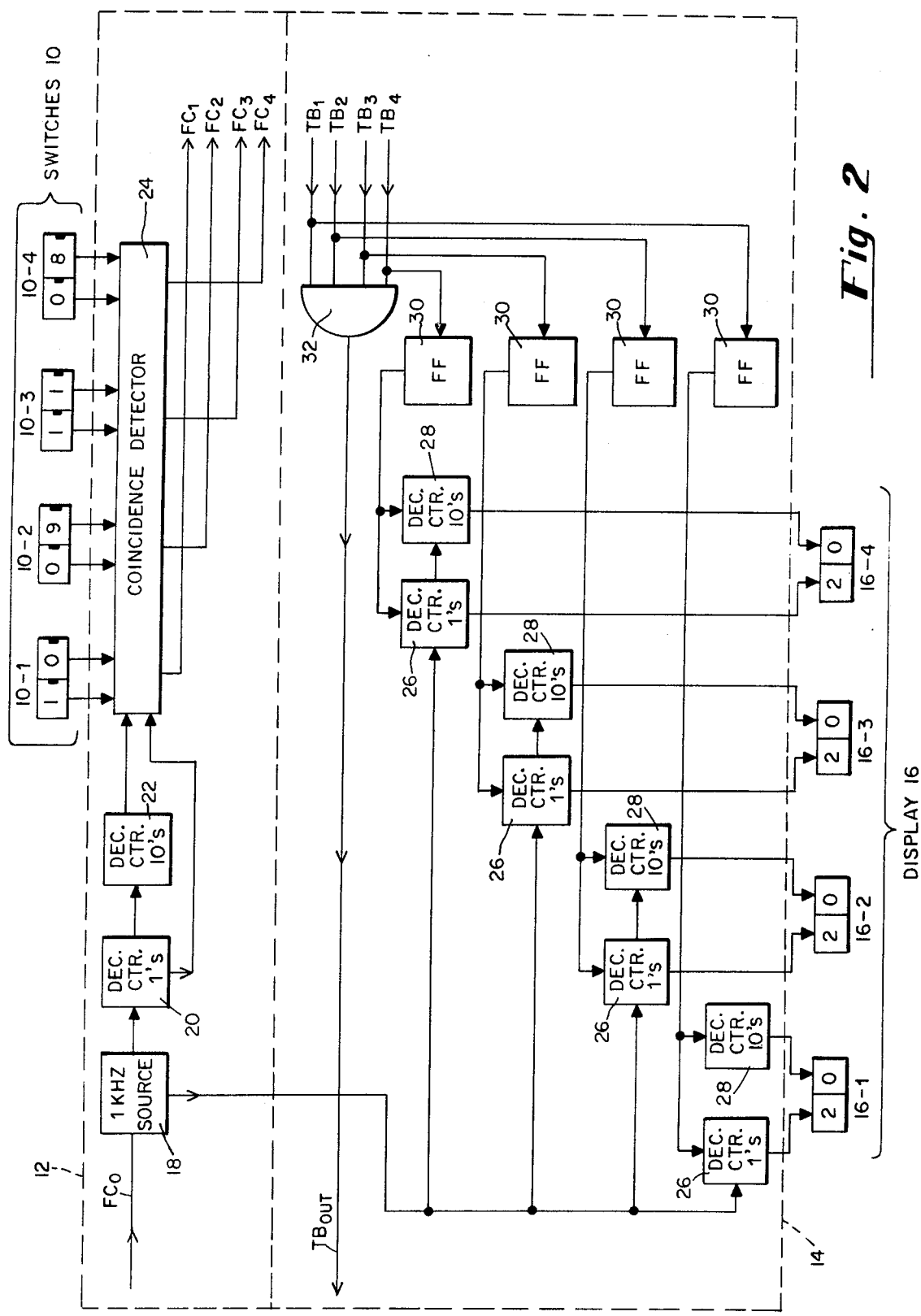
FIG. 2 is a block diagram of the control system of FIG. 1.

As shown in FIG. 2, the digital control system embodying the invention is further detailed in block diagram form. The switch means 10 includes a plurality of thumbwheel digital switches 10–1, 10–2, 10–3, and 10–4 calibrated in ms. (milliseconds) associated respectively with the four pneumatic sound sources or guns 1, 2, 3, and 4 (not shown). The setting of any one switch presets a particular firing command delay time for the respective gun; i.e., a predetermined delay between the system firing command $FC_0$ and the respective gun firing commands $FC_1$, $FC_2$, $FC_3$, and $FC_4$.

The firing command delay means 12 comprising a 1KH$_z$ source 18 of gated clock pulses is coupled to units and tens decade counters 20 and 22 to produce a continuously accumulating count throughout the firing cycle representing the time elapsed since system triggering. A coincidence detector 24 detects a coincidence between the firing command delays established by the digital switches 10–1, 10–2, 10–3 and 10–4 and the continuously accumulating count in the decade counters 20 and 22 which corresponds to elapsed time in ms. The firing commands $FC_1$, $FC_2$, $FC_3$ and $FC_4$ are then applied to the respective guns in response to the detected coincidences.

The actual firing delay means 14 also comprises decade counters which accumulate counts corresponding to the elapsed time between the system firing $FC_0$ and the time breaks $TB_1$, $TB_2$, $TB_3$, and $TB_4$. In order to determine the actual firing delay for each gun, units and tens decade counters 26 and 28 are associated with each gun. Upon receiving a time break TB, a flip-flop 30 associated with each gun is reset and the count accumulating in the corresponding decade counters 26 and 28 is terminated. This count can then be displayed at an appropriate one of the display units 16–1, 16–2, 16–3, and 16–4. A time break $TB_{out}$ corresponding to the earliest of the time breaks $TB_1$, $TB_2$, $TB_3$ and $TB_4$ is obtained from NAND gate 32.

Figure 3:
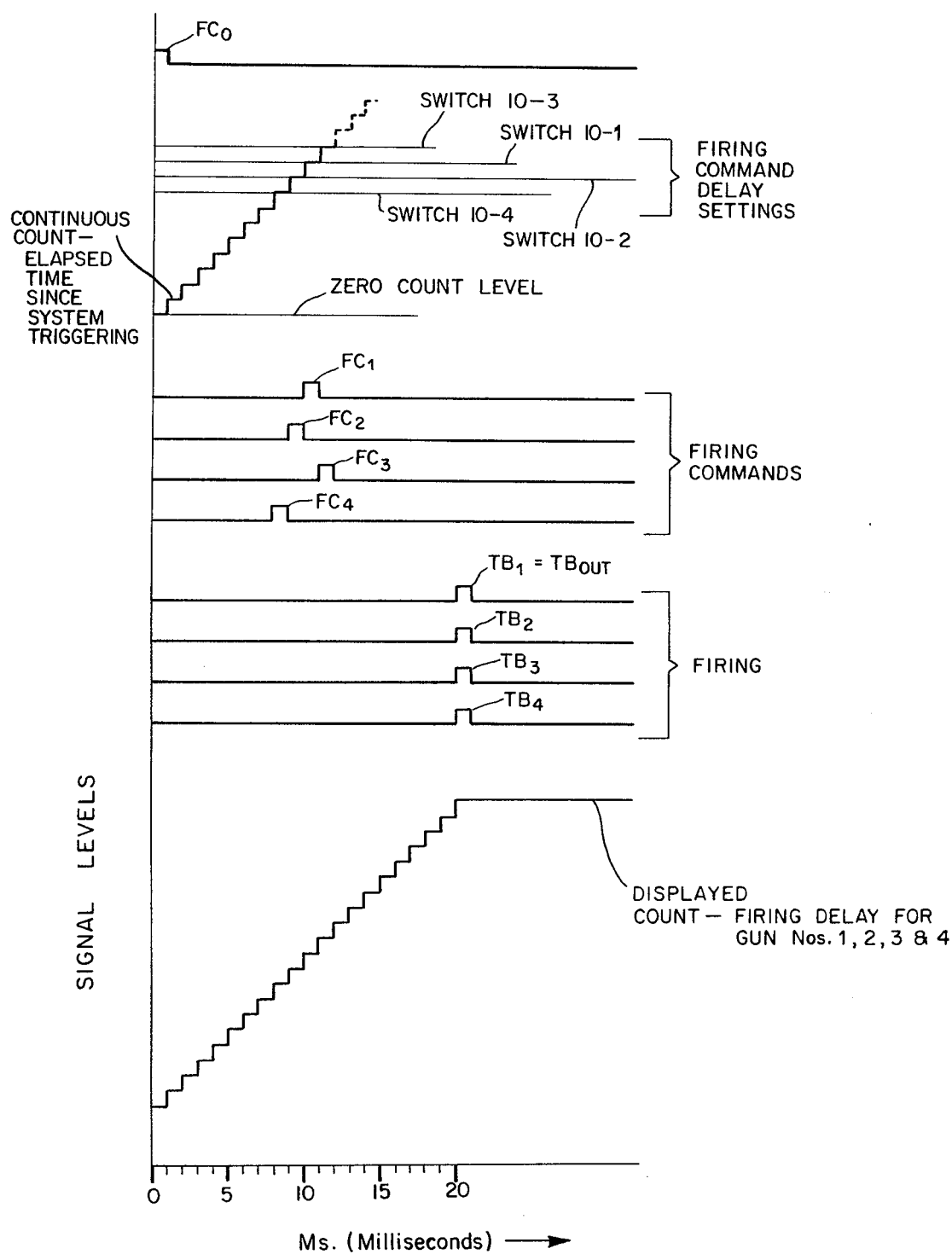
FIG. 3 is a timing diagram for the system of FIG. 2.

The operation of the digital control system shown in FIG. 2 will now be generally described in reference to FIG. 3 wherein the abscissa represents time in ms. and the ordinate represents signal levels. Before triggering, the illustrative firing command delays of 10 ms., 9 ms., 11 ms., and 8 ms. are set on the respective digital switches 10–1, 10–2, 10–3, and 10–4. These delays are intended to provide simultaneous firing of the guns 1, 2, 3, and 4 with actual firing delays of 20 ms. where characteristic firing delays of 10 ms., 11 ms., 9 ms., and 12 ms. have been assumed. For purposes of explanation, these desired firing command delays, which are digitally represented in the system of FIG. 2, have been shown in analog form.

The system is now triggered by the system firing command $FC_0$ and count begins to accumulate in the counters 20 and 22. As the count, which represents elapsed time since system firing command $FC_0$, coincides with the firing command delay setting on the switch 10–4, the coincidence detector 24 is satisfied and a firing command $FC_4$ is simultaneously generated for gun 4 after 8 ms. As the count continues to accumulate, firing commands are similarly generated for guns 2, 1, and 3 after 9, 10, and 11 ms. respectively. The guns are then fired simultaneously at 20 ms. after different characteristic firing delays of the guns.

Throughout this sequence of events, counts have been accumulating in each set of decade counters 26 and 28 representing elapsed times since system triggering, one count for each of the guns 1, 2, 3 and 4. As the guns are fired, the respective counts are terminated so as to represent the actual firing delays of 20 ms. between the system firing command $FC_0$ and the time breaks $TB_1$, $TB_2$, $TB_3$ and $TB_4$. These binary encoded firing delays, each 20 ms. long, are then displayed in decimal form on the individual displays 16–1, 16–2, 16–3, and 16–4.

If any of the displayed actual firing delays deviate from 20 ms., this indicates that the assumed characteristic firing delay for the particular gun(s) in question is incorrect. The corresponding switch(es) 10 must then be reset to account for the true characteristic firing delay. After continuous use, the characteristic firing delays of a gun will vary. By use of this control system, such a variance can easily be accommodated by merely watching the display 16 and resetting the appropriate switches 10 as the need arises.

Figure 4A:
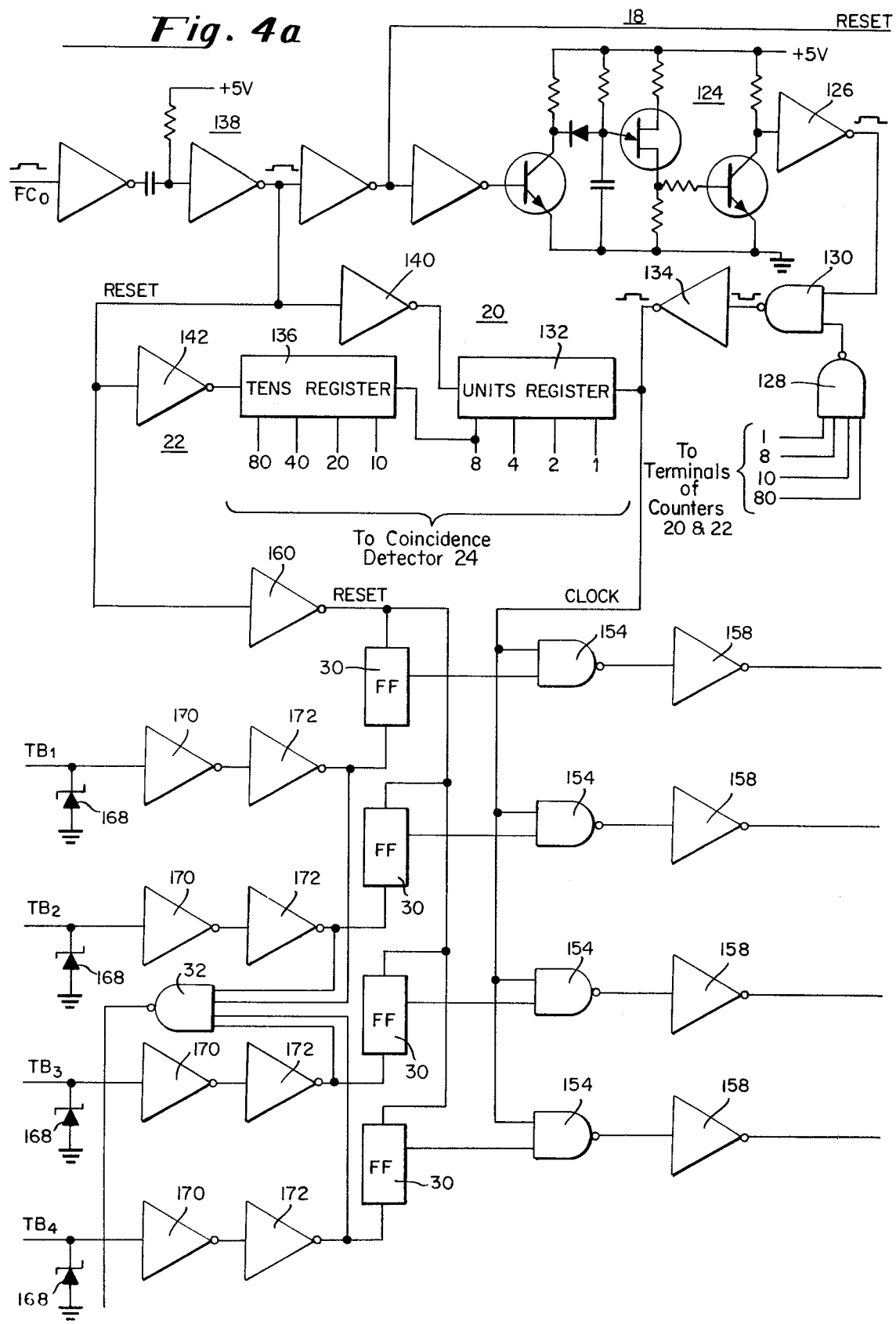
FIGS. 4a and 4b are matched schematic diagrams of some of the digital circuitry of FIG. 2.
Figure 4B:
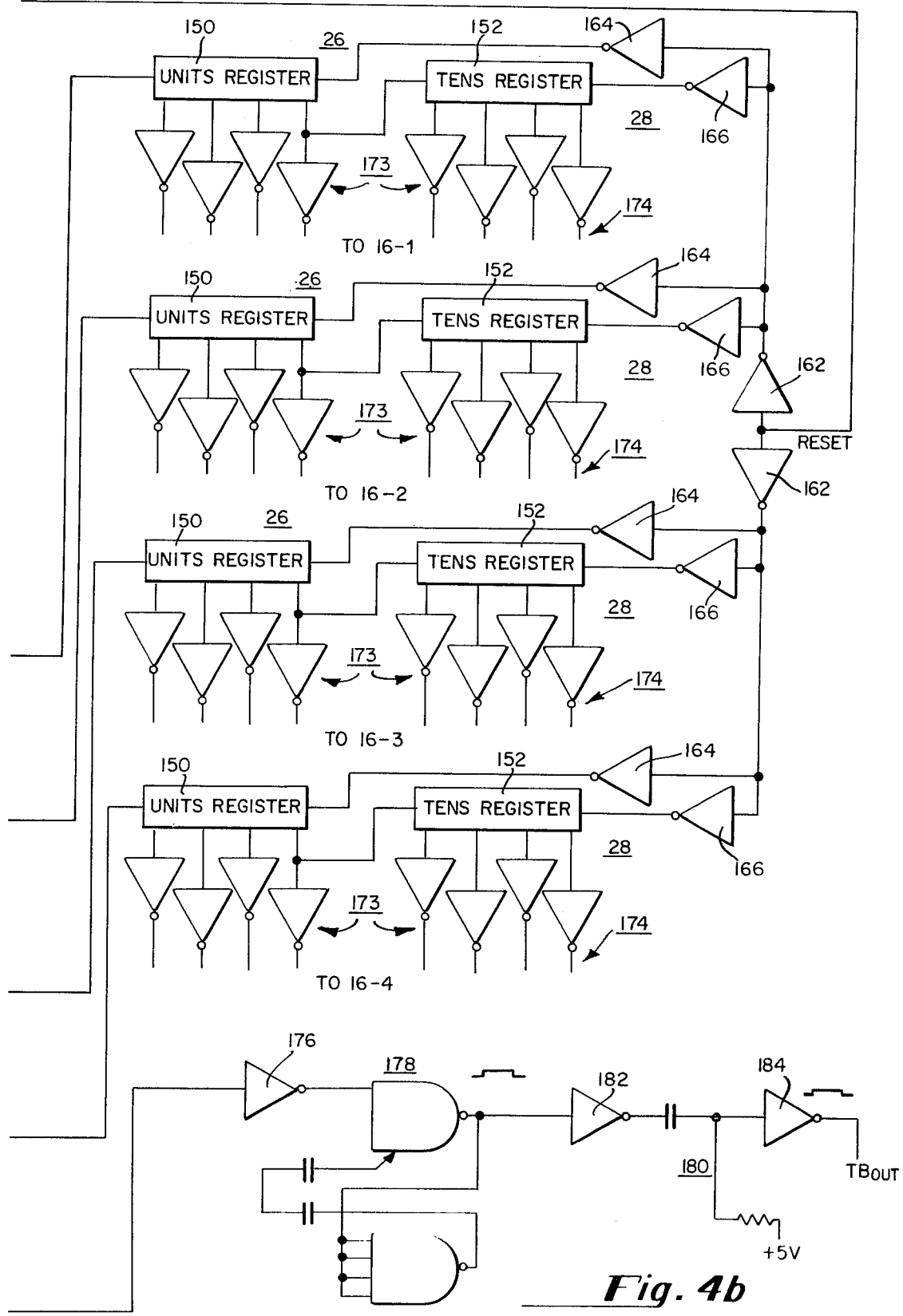

The digital circuitry of the firing command delay means 12 and the actual firing delay means 14 will now be described in detail with reference to FIGS. 4a, 4b, and 5. Referring to FIGS. 4a and 4b, the source 18 comprises a unijunction 1 KHz oscillator 124, an inverter 126, a NAND gate 128 and a NAND gate 130 having one input connected to the output of the inverter 126 and the other input connected to the output of the NAND gate 128. The unit decade counter 20 comprising a register 132 is coupled to the output of the NAND gate 130 through an inverter 134 and the tens decade counter 22 comprising a register 136 is coupled to the output of the register 132. When the system firing command $FC_0$ is applied to the series of inverters 138, the registers 132 and 136 are reset through the inverters 140 and 142 and the NAND gate 130 is enabled by the NAND gate 128 to begin the continuously accumulating count representing elapsed time since system triggering. As the count accumulates in the counters 20 and 22, signals representing binary encoded elapsed time are produced at the counter output terminals shown and applied to corresponding input terminals of the coincidence detector 24.

Figure 5:
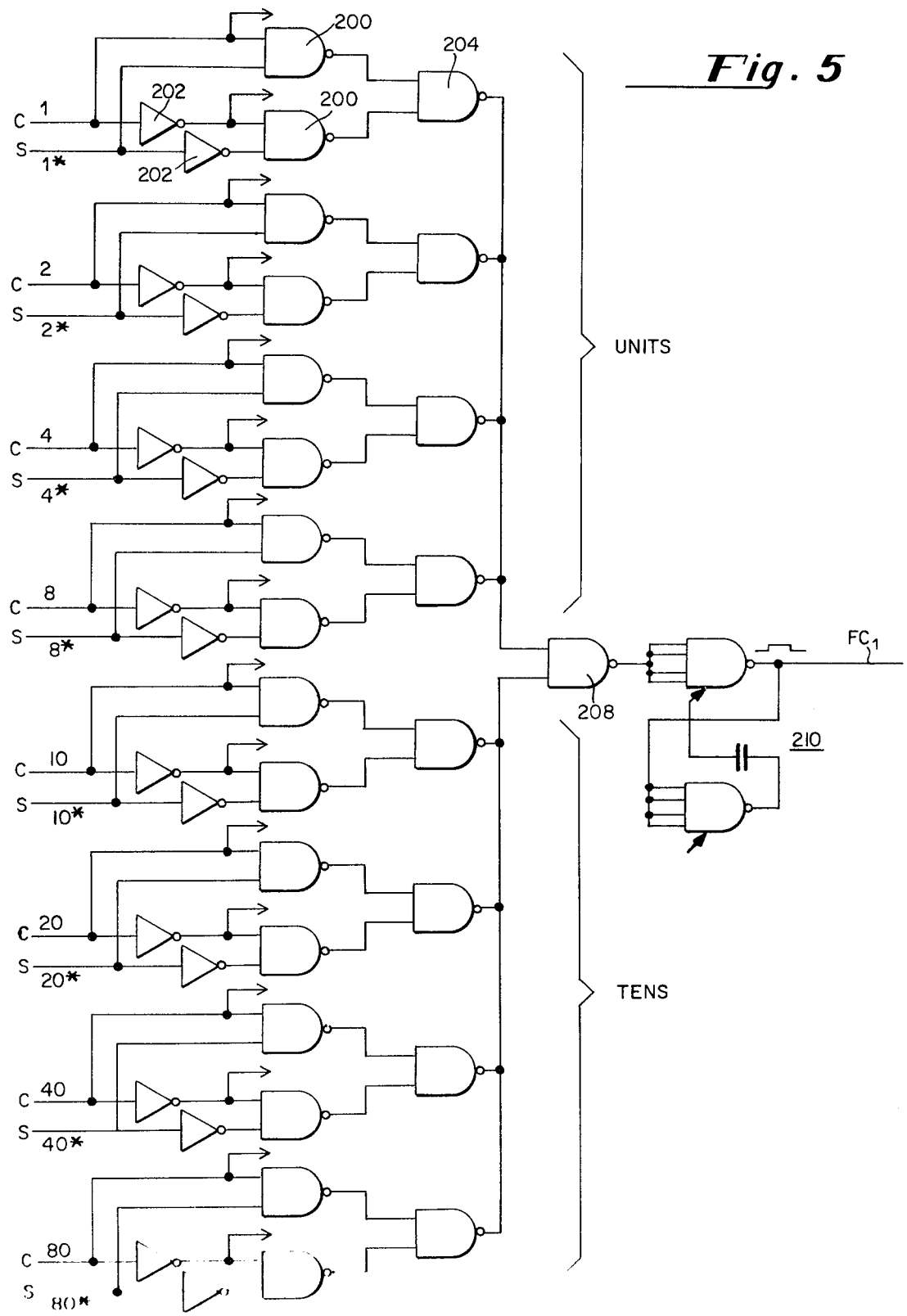
FIG. 5 is a schematic diagram of a portion of the coincidence detector of FIG. 1.

The portion of the coincidence detector associated with gun 1 is shown in FIG. 5. By detecting a coincidence between digital signals from the counters 20 and 22 which are applied at input terminals C1, C2, C4, C8, C10, C20, C40 and C80 and digital signals from the switch 10–1 which are applied at switch terminals S1, S2, S4, S8, S10, S20, S40 and S80, then a signal representing the first command signal $FC_1$ may be obtained from the output of the detector.

The detector comprises a pair of parallel connected NAND gates 200 associated with each of the input terminals C and S with one of the NAND gates 200 having inverters 202 in the input. The outputs of each pair of parallel NAND gates 200 is then applied to a NAND gate 204. By connecting all of the units NAND gates 200 and all of the tens NAND gates 200 together and applying the output signals to the NAND gate 208 connected to a one-shot multivibrator 210, a pulse of 25 ms. duration may be obtained for use as the signal representing the firing command $FC_1$. Identical circuitry may be associated with the switches 10–2, 10–3, and 10–4 for generating signals representing firing commands $FC_2$, $FC_3$, and $FC_4$.

Referring again to FIGS. 4a and 4b, each of the units decade counters 26 comprising registers 150 and each of the tens decade counters 28 comprising registers 152 are connected to the source 18 of gated clock pulses through NAND gates 154, which are enabled by flip-flops 30, and series-connected inverters 158. When the system firing command $FC_o$ is applied to the series of inverters 138 and resets the flip-flops 30 through an inverter 160, the NAND gate 154 is enabled to initiate the accumulation of a count in the registers 150 and 152 which have been reset by the system triggering pulse through inverters 162, 164, and 166.

The count accumulates in the pairs of registers 150 and 152 associated with the guns. Upon firing, signals representing the time breaks $TB_1$, $TB_2$, $TB_3$ and $TB_4$ are applied to the flip-flops 30 through Zener diodes 168 and inverters 170 and 172 to terminate the accumulating count. Signals representing the binary encoded accumulated counts corresponding to the firing delays between system firing command $FC_o$ and the TB's of the guns are inverted by inverters 173 and appear at output terminals 174. The binary encoded delay signals are then applied to corresponding terminals of the individual displays 16–1, 16–2, 16–3, and 16–4. A very effective display may be obtained by using light-emitting diodes in the individual displays 16–1, 2, 3 and 4.

In order to generate a signal from the earliest firing of the four guns or time break $TB_{out}$, the outputs of the inverters 170 and 172 are OR'ed by means of a NAND gate 32. The output of the NAND gate 32 is then applied to the seismic system through an inverter 176 and a one-shot multivibrator 178 to stretch the pulse and immunize the $TB_{out}$ against gun chatter. The width of the pulse is then reduced by an RC combination 180 and inverters 182 and 184.

The digital control system described may be used to fire guns simultaneously as shown and described. In the alternative, different or staggered firing delay times may be set on the digital switches 10–1, 2, 3 and 4 in the following manner so as to achieve a certain directivity where gun no. 1 is located at a water depth of 20 feet, gun no. 2 is located at a water depth of 30 feet, gun no. 3 is also located at a water depth of 30 feet, and gun no. 4 is located at a water depth of 40 feet. If it is assumed that the inherent firing delay of all of the guns are identical and equal to 12 ms., the switch 10–1 associated with gun no. 1 may be set for a 3 ms. firing command delay time to achieve a 15 ms. firing delay. Digital switches 10–2 and 10–3 may both be set for 5 ms. delays corresponding to a 17 ms. firing delay time since it takes 2 ms. for the sound to travel 10 feet between gun no. 1 and guns nos. 2 and 3. Digital switch 10–4 may be set to 7 ms. corresponding to a 19 ms. firing delay time since it takes sound 4 ms. to travel 20 feet between gun no. 1 and gun no. 4. By utilizing the system in this manner to control the firing of guns at different water depths during marine exploration, the primary pulse produced by the guns tends to be reinforced while the bubble pulse tends to be canceled.

Although the invention has been described in terms of the apparatus and method of operating a particular system, it will be understood that the invention comprehends various modifications and equivalents of that system which fall within the scope of the appended claims.

What is claimed:

1. A control system for firing a plurality of seismic sound sources by respective firing commands in response to system triggering, comprising:
   a means for presetting a variable firing command delay with respect to system triggering for each of said sound sources;
   a means for determining the time elapsed after system triggering;
   a means for detecting a coincidence between the time elapsed after system triggering and said preset firing command delay for each of said sound sources;
   a means for generating a firing command signal for firing each of said sound sources in response to the respective detected coincidences;
   a source of gated clock pulses; and
   a means for displaying a count representing the overall firing delay time with respect to system triggering for each of said sound sources comprising:
      a firing delay register means associated with each of said sound sources coupled to said source of gated clock pulses for accumulating a count representing elapsed time after system triggering;
      a gate means responsive to the firing of each of said sound sources for terminating the further accumulation of the count in each of said firing delay register means; and
      a means for displaying the accumulated count in each of said firing delay register means.

2. The control system of claim 1 comprising gate means for detecting the first firing of said sound sources.

3. A method of operating a control system for firing a plurality of seismic sources, comprising the steps of:
   presetting variable firing command delays for said respective sound sources;
   triggering a firing cycle for said sound sources;
   determining the elapsed time after triggering the firing cycle;
   generating firing commands for said respective sound sources when the elapsed time equals the firing command delays;
   determining the system firing delays represented by the elapsed time between triggering of the firing cycle and firing of said respective sound sources; and
   displaying said system firing delays for said respective sound sources.

4. The method of claim 3 wherein at least one of the firing command delay means is reset to correct for changes in the characteristic firing delay of at least one of the sound sources as determined by the display of the system firing delays.

5. A method of operating a control system for simultaneously or sequentially firing a plurality of pneumatic sound sources in which the sequence of the actual firing times of the sound sources are not identical with the sequence of the firing commands applied to the respective sound sources, said difference in sequences being due to differences in the characteristic firing delays of the sound sources, comprising the steps of:
   generating a system firing command;
   presetting variable firing command delays for said sound sources;

generating source firing commands for firing each of the sound sources, said source firing commands being delayed in time from said system firing command by the amount of the respective preset firing command delays;

generating time break signals upon the actual firing of said sound sources;

determining the elapsed time between the system firing command and the time break for each sound source, said elapsed time representing both the preset firing command delay and the characteristic firing delay for such source; and adjusting said firing command delays to compensate for changes in the characteristic firing delays of the respective sound sources such that the elapsed times between generation of said system firing command and the actual firings of the respective sound sources are maintained simultaneous or in the desired sequence.

6. A system for marine seismic exploration, comprising:

a plurality of pneumatic sound sources having characteristic delay times from the application of a source firing command to the actual firing of the source sound which vary with usage, comprising:

means for generating a system firing command;

a source of gated clock pulses triggered by said system firing command;

a first counter having an input coupled to the output of said source of gated clock pulses for accumulating a count corresponding to the time elapsed after generation of said system firing command;

means for presetting a variable firing command delay for each of said sound sources;

a coincidence detector with a first input coupled to the count output of said first counter and a second input coupled to the variable firing command delays for generating a source firing command for each of said sound sources upon the coincidence between the count in said first counter and the preset firing command delay for the respective sound source;

means for generating a time break upon the actual firing of said sound sources;

second counters for each of said sound sources having inputs coupled to the output of said source of gated clock pulses for accumulating counts representing the elapsed time after generation of the system firing command;

gate means responsive to said time break signals for terminating the further accumulation of counts in each of said second counters; and means for displaying the accumulated count in each of said second counters whereby the variable firing command delays for each of the sound sources may be adjusted to compensate for variations in said characteristic delay times so as to permit the desired sequence of sound source firings to be maintained.

* * * * *